Dec. 31, 1957     D. L. JAFFE ET AL     2,818,529
LIGHT-ACTUATED SWITCHING DEVICE
Filed Sept. 10, 1954
Fig. 1.
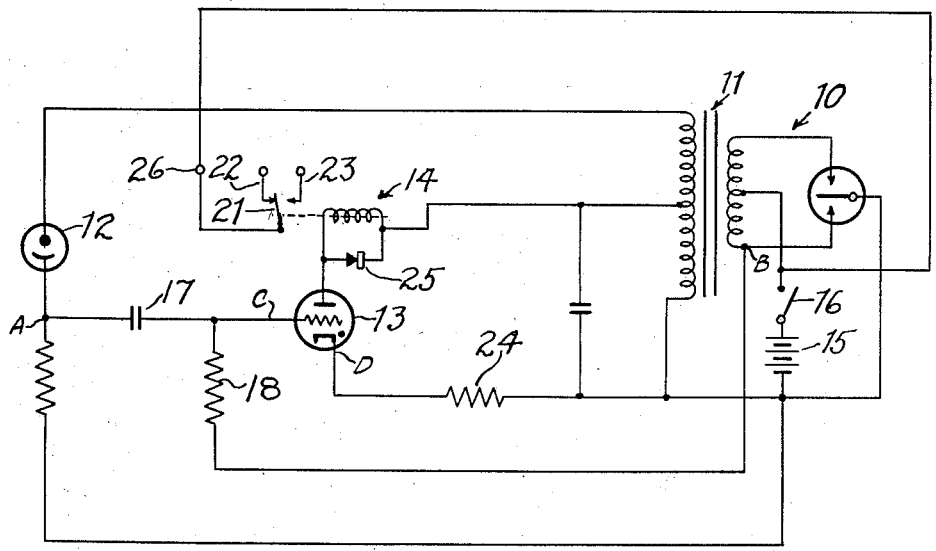
Fig. 2.
THYRATRON NON-CONDUCTIVE
- VOLTAGE AT A
- VOLTAGE AT B
- VOLTAGE AT C
Fig. 3.
THYRATRON CONDUCTIVE
- VOLTAGE AT A
- VOLTAGE AT B
- VOLTAGE AT D
- VOLTAGE AT C
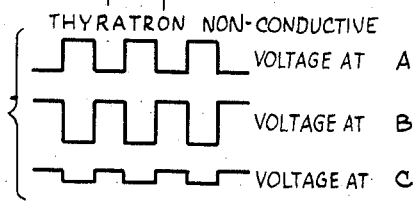
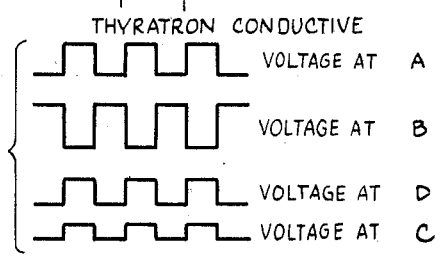
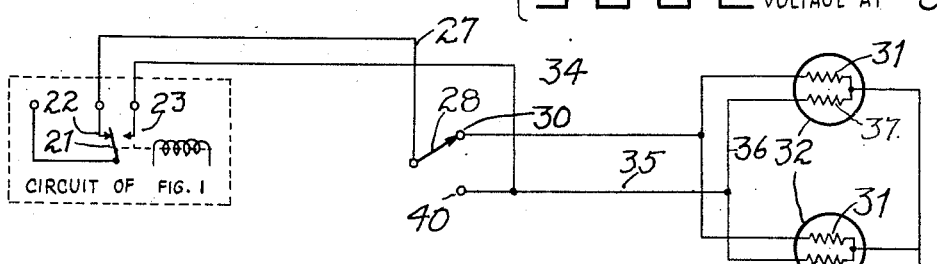
Fig. 4.
INVENTORS
D. LAWRENCE JAFFE
LOUIS ALAN ROSS
BY *Darby + Darby*
ATTORNEYS

United States Patent Office 2,818,529
Patented Dec. 31, 1957

2,818,529

LIGHT-ACTUATED SWITCHING DEVICE

David Lawrence Jaffe, Great Neck, and Louis Alan Ross, Brooklyn, N. Y., assignors to Polarad Electronics Corporation, Brooklyn, N. Y., a corporation of New York Application September 10, 1954, Serial No. 455,132

4 Claims. (Cl. 315—83)

The present invention relates to light-actuated switching devices and particularly to a light-actuated device for switching automobile headlights from the high to the low beam.

More particularly still the invention comprises a light-actuated switching device utilizing a single photo-electric or photo-multiplier tube and a single thyratron tube in combination with a vibrator to effect the control as contrasted with known devices of this type which utilize a multiplicity of vacuum tubes.

When used in connection with the dimming of automobile headlights the device is so arranged that the high beam is automatically turned off and the low beam turned on whenever light strikes the photoelectric cell, and further so that if for any reason the device fails the headlight system is automatically returned to its original condition and the headlights can be controlled by the operator in the same manner as is now customary.

The arrangement is such that the driver may dim his lights at any time and leave them dim, and additionally, the circuit arrangement of this invention assures that once the lights have been dimmed they will not return to the high beam as a result of momentary reduction in the intensity of the light striking the photosensitive device. A further feature of the invention is a circuit arrangement which makes the switching means relatively insensitive to voltage variations in the power supply which are frequent in an automobile due to the use of a battery and a generator which does not at all times maintain the battery voltage at the same value.

It is an object of the invention to provide a light actuated electrical circuit for the automatic control of electrical and electro-mechanical equipment.

It is another object of the invention to provide such a light-actuated system utilizing a single thyratron tube rather than a multiplicity of vacuum tubes which is now commonly the case.

It is another object of the invention to provide a light-actuated control system as mentioned above having means for producing a differential in the sensitivity of the control circuit thus requiring more light to actuate the switching device than is required to maintain it is its switched position.

It is a further object of the invention to provide a circuit in which the sensitivity is stable and does not vary with the supply voltage.

It is a further object of the invention to utilize as the final controlling element a direct current relay having a diode in shunt across it thus procuring the reliability of a direct current relay while at the same time utilizing alternating current to actuate the D. C. relay.

It is a still further object of the invention to provide a circuit which can readily be incorporated in the usual lighting circuit of an automobile in such manner that when light strikes the photosensitive device the headlights are automatically switched to the low beam while at the same time making it possible for the operator to choose the low beam and to prevent automatic operation switching from the low to the high beam.

Additionally, the light-actuated switching system is arranged in the headlight circuit so that once the lights have been switched to the low beam they will not return to the high beam as a result of momentary reduction of intensity of light striking the photosensitive device, and as the result the momentary intervention of another object between the headlights of an approaching automobile and the photosensitive device will not result in switching the lights controlled by the device to the high beam nor will the lowering of the beam of the lamps of an approaching car cause return to the high beam.

Other objects and features of the invention will be apparent when the following description is considered in connection with the annexed drawings, in which Figure 1 is a circuit diagram of the light-actuated switching system of our invention;

Figure 2 shows the voltage wave forms at various points in the circuit when the thyratron is non-conductive;

Figure 3 shows the voltage wave forms at various points in the circuit when the thyratron is conductive; and Figure 4 is a wiring diagram showing the manner of connecting the circuit of Figure 1 into the headlight circuit of an automobile in order to effect the results above mentioned.

Referring now to the drawings and particularly to Figure 1, it will be seen that the elements of the circuit comprise a vibrator 10, transformer 11, a photosensitive device such as a photoelectric or photomultiplier tube 12, a thyratron tube 13 and a relay 14 together with various resistors and condensers as will later appear. The vibrator 10 is supplied with power from the battery 15 which, when the circuit is utilized for controlling automobile headlights, is the usual car battery, the current being supplied to the vibrator from the battery through switch 16 which is the usual headlight switch of the automobile when the device is used for this purpose.

A square wave A. C. voltage is supplied to the photoelectric tube 12 from the transformer 11 and vibrator 10. As a result, when the tube is rendered conductive due to light shining upon its sensitive element voltage pulses as indicated in the upper wave form of Figure 2 are developed at the point A and these pulses are applied to the grid of thyratron 13 through condenser 17.

The grid of tube 13 is also connected through a resistor 18 to a point B on the primary winding of transformer 11. This connection is so made that pulses are supplied to the grid 13 simultaneously with the supply of pulses thereto by the photo tube 12 but are 180° out phase. The pulses applied through resistor 18 are of course present at all times and bias the thyratron 13 to cut off. It will be noted that the transformer 11 supplies the plate circuit of the thyratron 13 with an A. C. square wave voltage which is in phase with the supply to the photosensitive tube.

When light strikes the photosensitive tube and the pulses previously mentioned appear in the output of that tube and are applied to the grid of thyratron 13, they coincide in time with the pulses applied over resistor 18, but are of opposite phase sense. The resultant voltage pulses on the grid C of tube 13 are shown in the lower wave form diagram of Figure 2. This resultant voltage reduces the bias and causes the thyratron to conduct. When the thyratron conducts, the plate current therethrough flows also through the winding 20 of relay 14 and actuates the relay so that the armature 21 thereof moves away from contact 22 and against contact 23, thus effecting the switching of the external circuit as will be hereinafter described.

It is desirable that the thyratron remain conducting even though there be a reduction in the amount of light received by the photosensitive tube 12 and a consequent voltage reduction in the pulse output of that tube which is applied to the grid of the thyratron. In order to produce this result, a resistor 24 is placed in the cathode lead of the thyratron 13. When the thyratron becomes conducting current flowing through the resistor 24 produces a series of voltage pulses at the cathode D as indicated at D in Fig. 3. Since the tube is at that time conductive pulses appear on the grid of the thyratron as well as at the cathode. This voltage is algebraically added to the voltage at points A and B and thus the voltage on the grid at this time is that indicated in Figure 3 at C. Thus, when the thyratron becomes conductive the average direct current value on its grid becomes more positive making the circuit more sensitive to light. Capacitor 17 is charged by the increased potential on the grid of the thyratron 13 and tends to maintain this potential for a short period. It will be understood that the thyratron 13 is not continuously conductive, but may be cyclically fired by the alternating voltage from the transformer 11. The charge of capacitor 17 is retained in part through the period when the thyratron is extinguished due to reversal of polarity of the transformer voltage. The charge of capacitor 17 thus allows thyratron 13 to be fired by a voltage pulse of lesser magnitude (at junction A) during the succeeding voltage cycles from transformer 11. Because a light level which is sufficient to render the thyratron conductive becomes, after the conductive period, more than sufficient to maintain conduction, the circuit is not sensitive to random variations in grid voltage, battery voltage and thyratron characteristics.

As has been indicated, the current flowing in the winding on relay 14 is a pulsating one, and therefore the magnetic force on the relay armature is likewise pulsating. Formerly in order to have a relay which was operable under such conditions the relay would have to be an A. C. relay. However, the efficiency of A. C. relays is not as great as that of D. C. relays and the current capacity of the contacts of an A. C. relay cannot be as great as the capacity of the contacts of a D. C. relay having equal coil power.

In order to avoid the use of the less efficient A. C. relay, a diode 25 is shunted across the coil of relay 14 with its polarity such that it will not conduct when the thyratron 13 is fired. However, at the end of each cycle the thyratron is extinguished and the voltage across the relay abruptly reverses as the magnetic field in the coil collapses. As is obvious, this causes a current through the diode so as to continue the pulse of current in the relay coil. Since this current is always in the same direction as that through the thyratron 13 the relay can be designed for direct current and will operate at maximum efficiency and with minimum current drain.

The arrangement above described and comprising resistor 18 and the resultant alternating current bias on the grid of the thyratron 13 stabilizes the sensitivity of the device against variations in supply voltage. As will be readily seen an increase in supply voltage causes an increase in the sensitivity of the light-sensitive device and an increase in the thyratron plate voltage. However, at the same time the rise in battery voltage increases the bias voltage on the thyratron, and since the changes mentioned are in opposite directions but in proportion, the sensitivity as a whole remains substantially constant.

As has been mentioned, one use of the circuit heretofore described is to control the dimming of automobile head lamps. In this instance the external circuit to be controlled consists primarily of the low and high beam filaments of the head lamps. In Figure 4 a typical automobile head lamp circuit is shown connected to the circuit of Figure 1. In this connection it should be noted that the switch 16 of Figure 1 may be the usual manually-operated headlight switch which is utilized to energize the head lamps but not to choose which beam shall be operated and the connection is made from the load side of this switch to the terminal 26 and thus to the armature 21 of relay 14.

The left-hand contact 22 of relay 14 is connected by means of the conductor 27 to the usual foot control beam switch of the headlight circuit and, when this switch is in the position shown and the relay armature lies on its left-hand contact 22, through switch point 30 to the high beams 31 of the two head lamps 32 and 33.

When the switch 28 is in the position indicated just above and the relay 14 is operated, a circuit is completed from armature 21 to relay contact 23 and over conductors 34, 35 and 36 to the low beams 37 and 38 of the two head lamps 32 and 33. Likewise, when switch 28 is placed on contact 40 a circuit is completed over conductor 27 and conductors 35 and 36 to the low beams 37 and 38.

It will be clear from the above that when no light strikes the light-sensitive device 12 relay 14 is de-energized and its armature 21 lies against the left-hand contact 22. This results in connecting the battery 15 through switch 16 to the tongue 28 of the manual dimmer switch, permitting the operator to select either bright or dim lights as he chooses. However, when light strikes the photocell 12 relay 14 is energized causing the armature 21 to rest against the right-hand contact 23 and de-energizing the high beam and energizing the low beam filament of each head lamp. Of course, if the operator has already chosen the low beams, this switching is without effect.

The circuit arrangement mentioned assures that should the system of Figure 1 fail the relay 14 is de-energized and the driver has the original wiring system available with all the normal headlight functions unimpaired. Additionally, the arrangement enables the driver to dim his lights at any time and if he so desires leave them dim. Moreover, the differential arrangement comprising the resistor 24 as heretofore described assures that once the lights have been dimmed they will not be returned to the high beam due to any momentary reduction of intensity of light striking the photocell 12. Were it not for the differential arrangement it would be possible for the momentary intervention of an object between the photocell and the oncoming car to cause the car lights to return to the high beam, and additionally, it would be possible that the dimming of the head lamps of the oncoming car would cause the lights to return to the high beam. With the arrangement set forth this cannot result and the car's head lamps are retained on the low beam until the oncoming car has been met and passed. Additionally, as has been stated, the circuit arrangement described is stable under varying supply voltages and thus eliminates changes in sensitivity resulting from varying supply voltages which in an automobile are far more likely to occur than in other situations since the battery voltage is subject to changes with changes in engine speed.

While we have described a preferred embodiment of our invention it will be understood that there are many variations which may be made in circuit details, battery polarities, etc. and therefore we wish to be limited not by the foregoing description, but solely by the claims granted to us.

We claim:

1. A light-actuated control circuit, comprising, in combination, a photoelectric element, means for applying alternating square wave voltage across said element, a thyratron tube having a grid, plate and cathode, means for applying alternating voltage between the plate and cathode of said thyratron tube in phase with the supply to said photoelectric element, means including a capacitor for applying only the alternating component of the output voltage of said photoelectric element between the grid and cathode of said thyratron tube, means for applying an alternating voltage of phase opposite to that of said photoelectric element alternating component between said thyratron grid and cathode to bias said thyratron to cut off when said photoelectric element is unlighted, and an impedance connected in series with the cathode of said thyratron whereby the cathode potential and hence the grid potential of said thyratron is made more positive when the thyratron is fired thereby charging said capacitor and lowering the firing threshold of said control circuit.

2. A circuit as claimed in claim 1, characterized in that said circuit includes a battery, a vibrator and a transformer, said vibrator generating said square wave voltages applied to said photoelectric cell and the plate and grid circuits of said thyratron, said voltage on said thyratron grid causing increasing bias toward cut off of said thyratron tube as the plate voltage increases, whereby the sensitivity of said circuit is not substantially affected by variations in the battery voltage.

3. A circuit as claimed in claim 1, characterized in that a relay is provided, said relay having its plate winding in the plate circuit of said thyratron, said relay contacts controlling an external circuit.

4. A circuit as claimed in claim 3 characterized in that said relay is a direct current relay and further characterized in that a diode is shunted across said relay winding said diode being poled to prevent passage of current therethrough when current flows in said plate circuit and relay winding, said diode permitting current to flow during portions of said cycle when said thyratron is nonconductive, whereby the collapsing field of said relay winding causes current to flow in the loop comprising said winding and said diode to maintain said relay operative, said diode permitting immediate release of said relay when said diode remains non-conductive during a period greater than a half cycle.

References Cited in the file of this patent

UNITED STATES PATENTS

| | | |
|---|---|---|
| 2,320,076 | Hall | May 25, 1943 |
| 2,476,389 | Schmidt | July 19, 1949 |
| 2,558,969 | Le Croy | July 3, 1951 |
| 2,615,079 | Pardue | Oct. 21, 1952 |